United States Patent
Kono et al.

(10) Patent No.: US 12,024,125 B2
(45) Date of Patent: Jul. 2, 2024

(54) CONTROL DEVICE AND NON-TRANSITORY STORAGE MEDIUM

(71) Applicant: KABUSHIKI KAISHA TOKAI RIKA DENKI SEISAKUSHO, Aichi (JP)

(72) Inventors: Yuki Kono, Aichi (JP); Shigenori Nitta, Aichi (JP); Masateru Furuta, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 44 days.

(21) Appl. No.: 17/237,565

(22) Filed: Apr. 22, 2021

(65) Prior Publication Data

US 2021/0370881 A1    Dec. 2, 2021

(30) Foreign Application Priority Data

May 26, 2020    (JP) .................................. 2020-091275

(51) Int. Cl.
*B60R 25/31* (2013.01)
*G05B 15/02* (2006.01)
*H04W 4/48* (2018.01)

(52) U.S. Cl.
CPC .............. *B60R 25/31* (2013.01); *G05B 15/02* (2013.01); *H04W 4/48* (2018.02)

(58) Field of Classification Search
None
See application file for complete search history.

(56) References Cited

U.S. PATENT DOCUMENTS

| 2006/0083406 | A1* | 4/2006 | Ishimura | G01S 13/84 382/106 |
| 2016/0307384 | A1 | 10/2016 | Sampei | |
| 2017/0318423 | A1* | 11/2017 | Reisinger | H04W 12/08 |
| 2018/0099643 | A1* | 4/2018 | Golsch | G01S 13/765 |
| 2018/0162321 | A1* | 6/2018 | Spiess | G07C 9/00309 |
| 2018/0234797 | A1* | 8/2018 | Ledvina | G07C 9/29 |

(Continued)

FOREIGN PATENT DOCUMENTS

| JP | 2016-199963 | 12/2016 |
| JP | 2018-048821 | 3/2018 |

(Continued)

OTHER PUBLICATIONS

Jang Jonghoon; English Translation corresponding to Korean Patent Application No. 20200111558 A, filed on Mar. 19, 2019. (Year: 2019).*

*Primary Examiner* — Umut Onat
(74) *Attorney, Agent, or Firm* — Greenblum & Bernstein, P.L.C.

(57) ABSTRACT

A control device including a control section configured to cause a ranging process of measuring a distance between communication devices to be executed a designated number of times, and control a subsequent process that is a process of using a ranging value that satisfies a designated allowable value, on a basis of whether or not at least any of a plurality of ranging values that have been acquired satisfies the designated allowable value. The control section controls start of the subsequent process when the ranging value that satisfies the designated allowable value is acquired.

11 Claims, 5 Drawing Sheets

(56) References Cited

U.S. PATENT DOCUMENTS

| | | | | |
|---|---|---|---|---|
| 2020/0084625 | A1* | 3/2020 | Kosugi | H04W 12/033 |
| 2020/0363524 | A1* | 11/2020 | Yoon | H04W 12/033 |
| 2021/0011143 | A1 | 1/2021 | Naiki et al. | |
| 2021/0027130 | A1* | 1/2021 | Ette | G07C 9/00309 |
| 2021/0028991 | A1* | 1/2021 | Nataraj | H04L 41/5045 |
| 2021/0179022 | A1* | 6/2021 | Hasegawa | B60R 25/002 |
| 2021/0364645 | A1* | 11/2021 | Kim | G01S 19/396 |
| 2021/0373119 | A1* | 12/2021 | Ohashi | G01S 5/0072 |

FOREIGN PATENT DOCUMENTS

| | | | | |
|---|---|---|---|---|
| JP | 2019-168439 A | | 10/2019 | |
| KR | 20200111558 A | * | 3/2019 | H04W 72/51 |
| WO | 2014/203958 | | 12/2014 | |

* cited by examiner

CONTROL DEVICE AND NON-TRANSITORY STORAGE MEDIUM

CROSS REFERENCE TO RELATED APPLICATION(S)

This application is based upon and claims benefit of priority from Japanese Patent Application No. 2020-091275, filed on May 26, 2020, the entire contents of which are incorporated herein by reference.

BACKGROUND

The present invention relates to a control device and a non-transitory storage medium.

In recent years, technologies of measuring a distance between devices in accordance with a result of transmitting/receiving signals between the devices have been developed. For example, JP 2018-48821A discloses a technology of measuring a distance between an in-vehicle device and a portable device by transmitting/receiving signals between the in-vehicle device and the portable device.

SUMMARY

In the case of performing the ranging process based on transmission/reception of signals as described above, it is also considered that the ranging process may be executed more than once to improve accuracy of ranging values to be acquired. However, electric power consumption increases as the number of times of execution of the ranging process increases.

Accordingly, the present invention is made in view of the aforementioned issue, and an object of the present invention is to provide a mechanism that makes it possible to suppress increase in electric power consumption while assuring accuracy of measuring a distance between devices.

To solve the above described problem, according to an aspect of the present invention, there is provided a control device comprising: a control section configured to cause a ranging process of measuring a distance between communication devices to be executed a designated number of times, and control a subsequent process that is a process of using a ranging value that satisfies a designated allowable value, on a basis of whether or not at least any of a plurality of ranging values that have been acquired satisfies the designated allowable value, wherein the control section controls start of the subsequent process when the ranging value that satisfies the designated allowable value is acquired.

To solve the above described problem, according to another aspect of the present invention, there is provided a non-transitory storage medium having a program stored therein, the program causing a computer to achieve a control function of causing a ranging process of measuring a distance between communication devices to be executed a designated number of times, and controlling a subsequent process that is a process of using a ranging value that satisfies a designated allowable value, on a basis of whether or not at least any of a plurality of ranging values that have been acquired satisfies the designated allowable value, wherein the control function controls start of the subsequent process when the ranging value that satisfies the designated allowable value is acquired.

As described above, according to the present invention, it is possible to provide the mechanism capable of suppressing increase in electric power consumption while assuring accuracy of measuring a distance between devices.

DETAILED DESCRIPTION OF THE EMBODIMENT(S)

Figure 1:
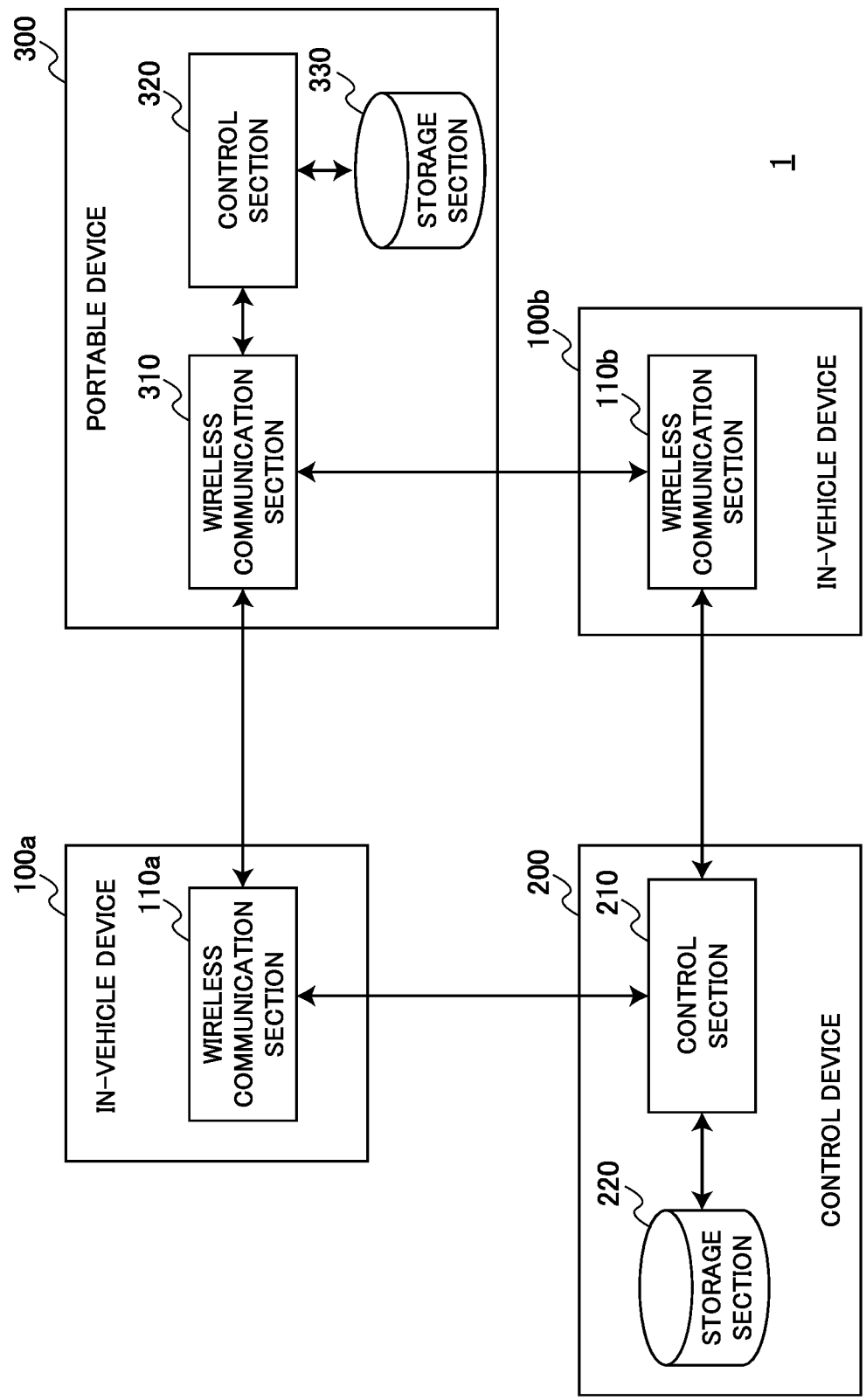
FIG. 1 is a diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. Overview

First, an overview of an embodiment of the present invention will be described. As described above, in recent years, technologies of performing authentication in accordance with a result of transmitting/receiving a signal between devices have been developed. For example, 2018-48821A discloses a technology of authenticating a portable device by transmitting/receiving a signal between an in-vehicle device and the portable device. By using such an authentication technology, for example, it is possible to achieve a function of canceling a door lock of a vehicle, a function of starting an engine, and other functions when a distance between the vehicle and a portable device carried by the user comes within a distance enabling communication.

However, for example, in the case of performing authentication between devices through a request-response scheme using ultra high frequency (UHF) or low frequency (LF), a relay may be used to relay a transmission signal of an in-vehicle device, and communication may be indirectly established between a portable device (authenticatee) and the in-vehicle device. In this way, a relay attack may be concerned. The relay attack may illegally establish authentication between the in-vehicle device and the portable device. Here, the request-response scheme is a method in which an authenticator generates an authentication request and transmits the generated authentication request to an authenticatee, the authenticatee generates an authentication response on the basis of the authentication request and transmits the generated authentication response to the authenticator, and the authenticator authenticates the authenticatee on the basis of the authentication response. Accordingly, a mechanism capable of preventing authenticatee spoofing such as the above-described relay attack and further improving authentication accuracy has been desired.

Therefore, for example, in addition to or instead of the inter-device authentication using the request-response scheme, the inter-device authentication might be performed on the basis of a ranging value acquired through a ranging process between the devices. By using the authentication process, it is possible to perform authentication in view of a value indicating a precise distance between the device, and it is possible to improve security.

On the other hand, accuracy of the ranging process based on transmission and reception of a signal is affected by a various kinds of factors. For example, there is a possibility that communication is not established through single transmission/reception in the case where an integrated circuit included in the device has low sensitivity or in the case where signal used for the communication is easily affected by an obstacle. In addition, in an environment where multipath easily occurs, propagation time of a signal that is transmitted from a source, reflected by another object, and then reaches a receiver is longer than propagation time of a signal that is transmitted from the source and then directly reaches the receiver. The multipath is a phenomenon where a signal transmitted from a single source but a receiver receives a plurality of signals. Therefore, there is a possibility that an acquired ranging value may be larger than an actual distance between device in the case where the ranging process is executed on the basis of the above-described signal that has been reflected by another object and then has reached a receiver.

Therefore, in the case of acquiring a highly accurate ranging value, it is also considered that a ranging process might be executed more than once and the highly accurate ranging value might be adopted from among ranging values that have been acquired. However, in this case, electric power consumption increases as the number of times of execution of the ranging process increases.

The technical idea of the present invention was conceived by focusing on the above-described points. The technical idea of the present invention makes it possible to suppress increase in electric power consumption while assuring accuracy of measuring a distance between devices. Accordingly, a control device according to an embodiment of the present invention includes a control section configured to cause a ranging process of measuring a distance between communication devices to be executed a designated number of times, and control a subsequent process that is a process of using a ranging value that satisfies a designated allowable value, on a basis of whether or not at least any of a plurality of ranging values that have been acquired satisfies the designated allowable value. In addition, one of features of the control section according to an embodiment of the present invention is to control start of the subsequent process when the ranging value that satisfies the designated allowable value is acquired. Next, details of a configuration example of the control device that provides the above-described features and details of a configuration example of a system including the control device will be described.

1.2. Configuration Example

FIG. 1 is a block diagram illustrating a configuration example of a system 1 according to the present embodiment. As illustrated in FIG. 1, the system 1 according to the present embodiment includes at least one or more in-vehicle devices 100, a control device 200, and a portable device 300, for example. FIG. 1 illustrates an example in which the system 1 includes two in-vehicle devices 100a and 100b. Hereinafter, the in-vehicle devices 100a and 100b are simply referred to as the in-vehicle devices 100 when there is no need in particular to distinguish the in-vehicle device 100a from the in-vehicle device 100b. Note that, the number of in-vehicle devices 100 according to the present embodiment is not limited thereto. The system 1 according to the present embodiment may include only one in-vehicle device 100. Alternatively, the system 1 may include three or more in-vehicle devices 100.

(In-Vehicle Device 100)

The in-vehicle device 100 is an example of the communication device according to an embodiment of the present invention. For example, the in-vehicle device 100 may be a communication unit installed in a vehicle that allows the user to get in (a vehicle owned by the user or a vehicle temporarily rented by the user).

As illustrated in FIG. 1, the in-vehicle device 100 includes a wireless communication section 110. The wireless communication section 110 performs communication with the portable device 300 in conformity with a predetermined wireless communication standard. For example, the wireless communication section 110 transmits and receives a ranging signal, which is necessary for the ranging process. In addition, examples of the designated wireless communication standard include a wireless communication standard using an ultra-wideband (UWB) (hereinafter, this standard will also be simply referred to as UWB). The UWB uses only short pulses. Therefore, the UWB consumes low electric power. In addition, the UWB does not use complicated modulation/demodulation schemes, and this is advantageous to reduction in cost. In addition, the UWB uses pulses of nanosecond order. This makes it possible to measure arrival time of a signal with high accuracy and perform ranging and positioning with high accuracy.

In addition, the wireless communication section 110 according to the present embodiment executes a ranging process of measuring a distance between the in-vehicle device 100 and the portable device 300 (more specifically, a distance between the wireless communication section 110 of the in-vehicle device 100 and a wireless communication section 310 of the portable device 300). The ranging process according to the present embodiment includes transmission of a first ranging signal from one of the communication devices to another communication device, transmission of a second ranging signal from the other communication device to the one communication device in response to the first ranging signal, and calculation of a ranging value on the basis of time it takes to transmit and receive the first ranging signal and the second ranging signal. In addition, for example, the first ranging signal and the second ranging signal may be transmitted through the UWB.

For example, the wireless communication section 110 transmits the first ranging signal, and receives the second ranging signal that the wireless communication section 310 of the portable device 300 transmits in response to the first ranging signal. Here, it is assumed that $\Delta T1$ represents a time period from when the wireless communication section 110 transmits the first ranging signal to when the wireless communication section 100 receives the second ranging signal, and $\Delta T2$ represents a time period from when the wireless communication section 310 receives the first ranging signal to when the wireless communication section 310 transmits the second ranging signal. In this case, time taken to perform two-way communication of the ranging signals is calculated by subtracting ΔT2 from ΔT1. In addition, time taken to perform one-way communication of a ranging signal is calculated by dividing the calculated time by 2. Accordingly, by multiplying the value obtained through (ΔT1-ΔT2)/2 by speed of the signal, it is possible for the wireless communication section 110 to calculate the ranging value indicating a distance between the in-vehicle device 100 and the portable device 300. For example, in the case where the wireless communication section 310 transmits the second ranging signal including the ΔT2 value, the wireless communication section 110 can calculate the ranging value from the ΔT2 value included in the received second ranging signal and the ΔT1 value calculated by the wireless communication section 110 itself. The wireless communication section 110 transmits the calculated ranging value to the control device 200, which is installed in the same vehicle, through a Controller Area Network (CAN), for example.

(Control Device 200)

The control device 200 is an example of the control device according to an embodiment of the present invention. The control device 200 may be installed in the vehicle, which is the same as the vehicle provided with the in-vehicle device 100. As illustrated in FIG. 1, the control device 200 according to the present embodiment includes a control section 210 and a storage section 220.

The control section 210 according to the present embodiment controls the ranging process to be performed by the in-vehicle device 100, and the subsequent process based on a result of the ranging process. For example, the control section 210 may cause the in-vehicle device 100 to execute the ranging process a designated number of times. In addition, the control section 210 may control the subsequent process that is a process of using a designated allowable value, on the basis of whether or not at least any of a plurality of ranging values that have been acquired satisfies the designated allowable value. In addition, the control section 210 may cause the ranging process to be executed the designated number of times for each combination of the communication devices, and control the ranging process and the subsequent process. At this time, the control section 210 may control start of the subsequent process when the ranging value that satisfies the designated allowable value is acquired.

For example, in the case where the designated allowable value is 10 meters and at least any of the plurality of ranging values that have been acquired is 10 meters or less, the control section 210 may control the start of the subsequent process. Such control makes it possible to precisely control the functions in accordance with the distance between the communication devices. Note that, the designated allowable value is not limited thereto. The designated allowable value may be 5 meters or 3 meters. It is possible to arbitrarily set the designated allowable value according to the present embodiment.

In addition, for example, the subsequent process according to the present embodiment may be an unlocking process of unlocking a lock device installed in an open/close mechanism. For example, the open/close mechanism includes a door of the vehicle provided with the in-vehicle device 100. In the case where at least any of the plurality of ranging values that have been acquired satisfies the designated allowable value, that is, in the case where the distance between the in-vehicle device 100 and the portable device 300 is a designated distance or less, the control section 210 according to the present embodiment may perform control in such a manner that the door of the vehicle is unlocked. Note that, the open/close mechanism according to the present embodiment is not limited to the door of the vehicle, but may be various kinds of doors installed in buildings such as a house, rockers, delivery lockers, or the like.

In addition, for example, the subsequent process according to the present embodiment may be an activation process of activating a predetermined device. Examples of the predetermined device include an engine of the vehicle provided with the in-vehicle device 100. In the case where at least any of the plurality of ranging values that have been acquired satisfies the designated allowable value, that is, in the case where the distance between the in-vehicle device 100 and the portable device 300 is the designated distance or less, the control section 210 according to the present embodiment may perform control in such a manner that it becomes possible to activate the engine of the vehicle.

Note that, the control section 130 according to the present embodiment may control a plurality of subsequent processes such as the unlocking process and the activation process described above. In addition, in this case, it is also possible for the control section 130 to perform control by using designated allowable values that vary among different subsequent processes. For example, the control section 130 can perform control in such a manner that the door of the vehicle provided with the in-vehicle device 100 is unlocked in the case where the distance between the in-vehicle device 100 and the portable device 300 becomes 10 meters or less, and the activation process of the engine is executable in the case where the distance becomes 1 meter or less. Details of the control exerted by the control section 210 over the ranging processes and the subsequent processes will be described later.

The storage section 220 stores various kinds of information related to operation of the control device 200. For example, the storage section 220 stores a program for operating the control device 200, identification information of the in-vehicle device 100 and the portable device 300, key information such as a password, the designated allowable value described above, or the like. For example, the storage section 220 includes a storage medium such as flash memory and a processing device that performs recording/playback on/of the storage medium.

(Portable Device 300)

The portable device 300 according to the present embodiment is an example of the communication device according to an embodiment of the present invention. The portable device 300 may be as any device to be carried by the user. Examples of the any device include an electronic key, a smartphone, a wearable terminal, and the like.

The portable device 300 according to the present embodiment includes the wireless communication section 310. The wireless communication section 310 performs communication with the wireless communication section 110 of the in-vehicle device 100 in conformity with the designated wireless communication standard. For example, the wireless communication section 310 transmits and receives ranging signals, which are necessary for the ranging process. For example, the wireless communication section 310 receives the first ranging signal transmitted from the wireless communication section 110, and transmits the second ranging signal in response to the first ranging signal.

On the other hand, the transmission and reception of the ranging signals according to the present embodiment are not limited to the above-described way. The wireless communication section 310 may transmit the first ranging signal, and receive the second ranging signal that the wireless communication section 110 transmits in response to the first ranging signal. In this case, the wireless communication section 310 may serve as a subject that executes the ranging process.

In addition, the portable device 300 may implement the functions of controlling the ranging process and the subsequent process. In other words, the portable device 300 may operate as the control device according to an embodiment of the present invention. In this case, the portable device 300 may include a control section 320 and a storage section 330. The control section 320 has a similar function to the control section 210 of the control device 200 described above, and the storage section 330 has a similar function to the storage section 220 described above.

The configuration example of the system 1 according to the present embodiment has been described above. Note that, the configuration described above with reference to FIG. 1 is a mere example. The configuration of the system 1 according to the present embodiment is not limited thereto. For example, as described above, the subject that executes the ranging process according to the present embodiment may be the wireless communication section 110 of the in-vehicle device 100, or may be the wireless communication section 310 of the portable device 300. In addition, the ranging process according to the present embodiment may be executed by the control section 210 of the control device 200 or by the control section 320 of the portable device 300. In this case, the control section 210 and the control section 320 can calculate the ranging value by acquiring the ΔT1 value and the ΔT2 values themselves or parameters for calculating ΔT1 and ΔT2 (for example, transmission time and reception time of the first ranging signal, and transmission time and reception time of the second ranging signal) from the wireless communication section 110 or the wireless communication section 310. In addition, as described above, the function of controlling the ranging process and the subsequent process according to the present embodiment may be implemented by the control device 200 or the portable device 300.

The configuration of the system 1 according to the present embodiment may be flexibly modified in accordance with specifications and operations.

1.3. Details

Next, details of control over the ranging process and the subsequent process according to the present embodiment will be described. First, a flow of processes performed in the case where a conventional general system executes a ranging process more than once and controls a subsequent process on the basis of acquired ranging values will be described.

Figure 2:
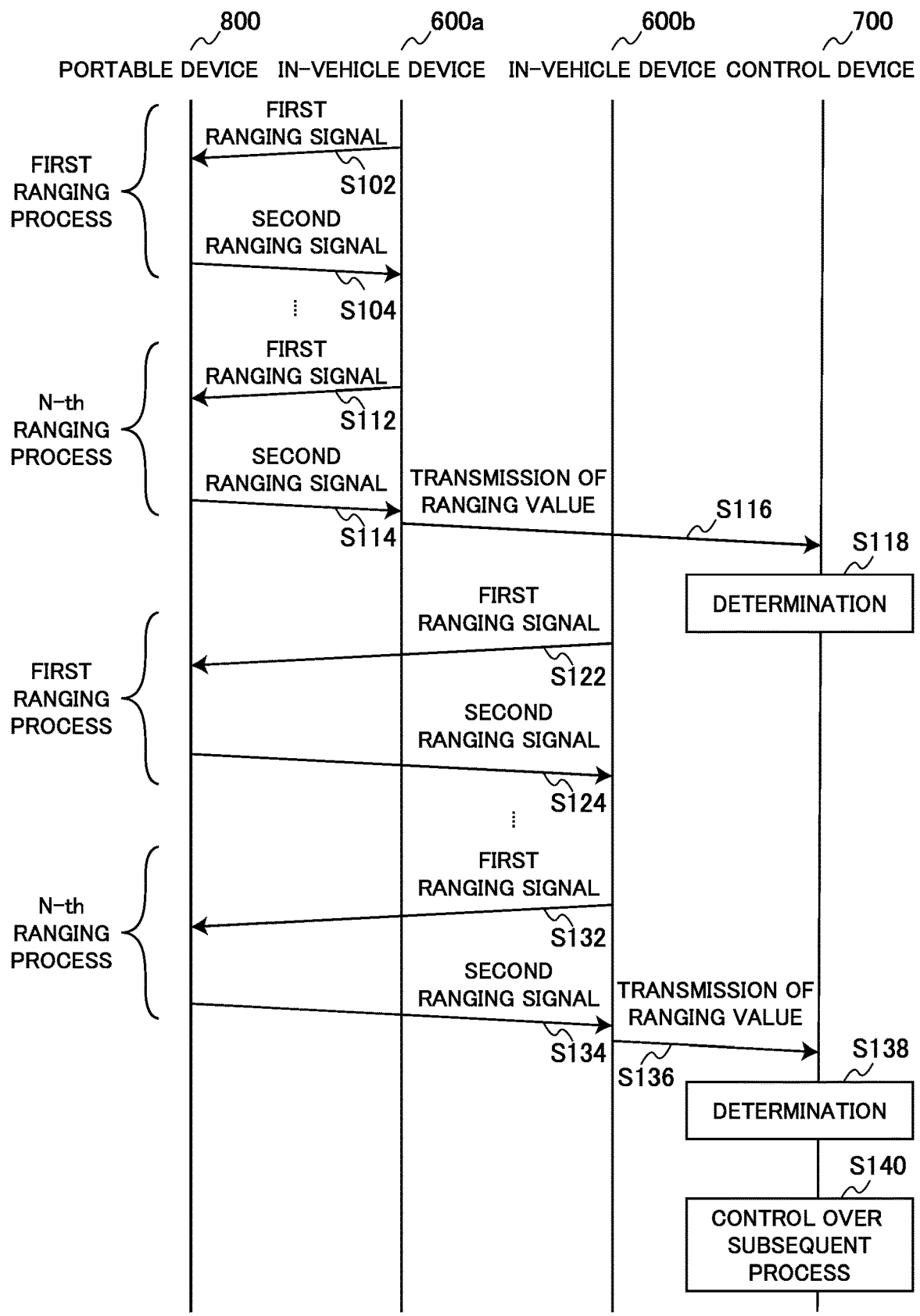
FIG. 2 is a sequence diagram illustrating a flow of control exerted by a conventional system over ranging processes and subsequent processes.

FIG. 2 is a sequence diagram illustrating a flow of control exerted by the conventional system over the ranging processes and the subsequent processes. Note that, FIG. 2 illustrates an example in which the conventional system includes two in-vehicle devices 600a and 600b, a control device 700, and a portable device 800.

In the case of the example illustrated in FIG. 2, the conventional system first executes a ranging process a designated number of times (N number of times). The ranging process is a process of measuring a distance between the in-vehicle device 600a and the portable device 800. Specifically, in a first ranging process, the in-vehicle device 600a transmits a first ranging signal (Step S102), and the portable device 800 transmits a second ranging signal (Step S104) in response to the first ranging signal transmitted in Step S102.

The in-vehicle device 600a and the portable device 800 repeat the above-described transmission of the ranging signals the N number of times, which is the designated number of times. In an N-th ranging process, the in-vehicle device 600a transmits the first ranging signal (Step S112), and the portable device 800 transmits the second ranging signal (Step S114) in response to the first ranging signal transmitted in Step S112. Subsequently, the in-vehicle device 600a calculates respective ranging values on the basis of the ranging signals transmitted and received in the ranging processes including the first ranging process to the N-th ranging process, and transmits the plurality of ranging values that have been calculated to the control device 700 (Step S116). Note that, the ranging value may be calculated each time the in-vehicle device 600a receives the second ranging signal.

Next, the control device 700 makes a determination (Step S118) on the basis of the plurality of ranging values that have been received in Step S116. For example, the control device 700 determines whether or not at least any of the plurality of ranging values satisfies a designated allowable value. For example, in the case where the designated allowable value is 10 meters and any of the plurality of ranging values is 10 meters or less, this may result in successful authentication between the in-vehicle device 600a and the portable device 800.

The conventional system executes the above-described ranging process more than once and makes a determination based on the ranging values acquired through the multiple ranging processes, repeatedly for each combination of the in-vehicle devices 600 and the portable device 800.

For example, in the case of the example illustrated in FIG. 2, a ranging process of measuring a distance between an in-vehicle device 600b and the portable device 800 is executed the designated number of times after Step S118. Specifically, in a first ranging process, the in-vehicle device 600b transmits a first ranging signal (Step S122), and the portable device 800 transmits a second ranging signal (Step S124) in response to the first ranging signal transmitted in Step S122.

The in-vehicle device 600b and the portable device 800 repeat the above-described transmission of the ranging signals the N number of times, which is the designated number of times. In an N-th ranging process, the in-vehicle device 600b transmits the first ranging signal (Step S132), and the portable device 800 transmits the second ranging signal (Step S134) in response to the first ranging signal transmitted in Step S132. Subsequently, the in-vehicle device 600b calculates respective ranging values on the basis of the ranging signals transmitted and received in the ranging processes including the first ranging process to the N-th ranging process, and transmits the plurality of ranging values that have been calculated to the control device 700 (Step S136).

Next, the control device 700 determines whether or not at least any of the plurality of ranging values that have been received in Step S136 satisfies the designated allowable value (S138). The control device 700 may determine that authentication between the in-vehicle device 600b and the portable device 800 is successful in the case where any of the plurality of ranging values satisfies the designated allowable value.

Here, in the case where the authentication between the in-vehicle device 600a and the portable device 800 in Step S118 is successful and the authentication between the in-vehicle device 600b and the portable device 800 in Step S138 is successful, the control device 700 performs control in such a manner that the subsequent process starts (Step S140).

The flow of the control exerted by the conventional system over the ranging processes and the subsequent processes has been described above. Such control makes it possible to precisely control the functions on the basis of distances between the communication devices.

However, the conventional system repeatedly executes the ranging process the designated number of times, for each combination of the communication devices. Therefore, electric power consumption increases as the number of combinations of communication devices increases and the number of times of repetition of the ranging process increases.

Figure 3:
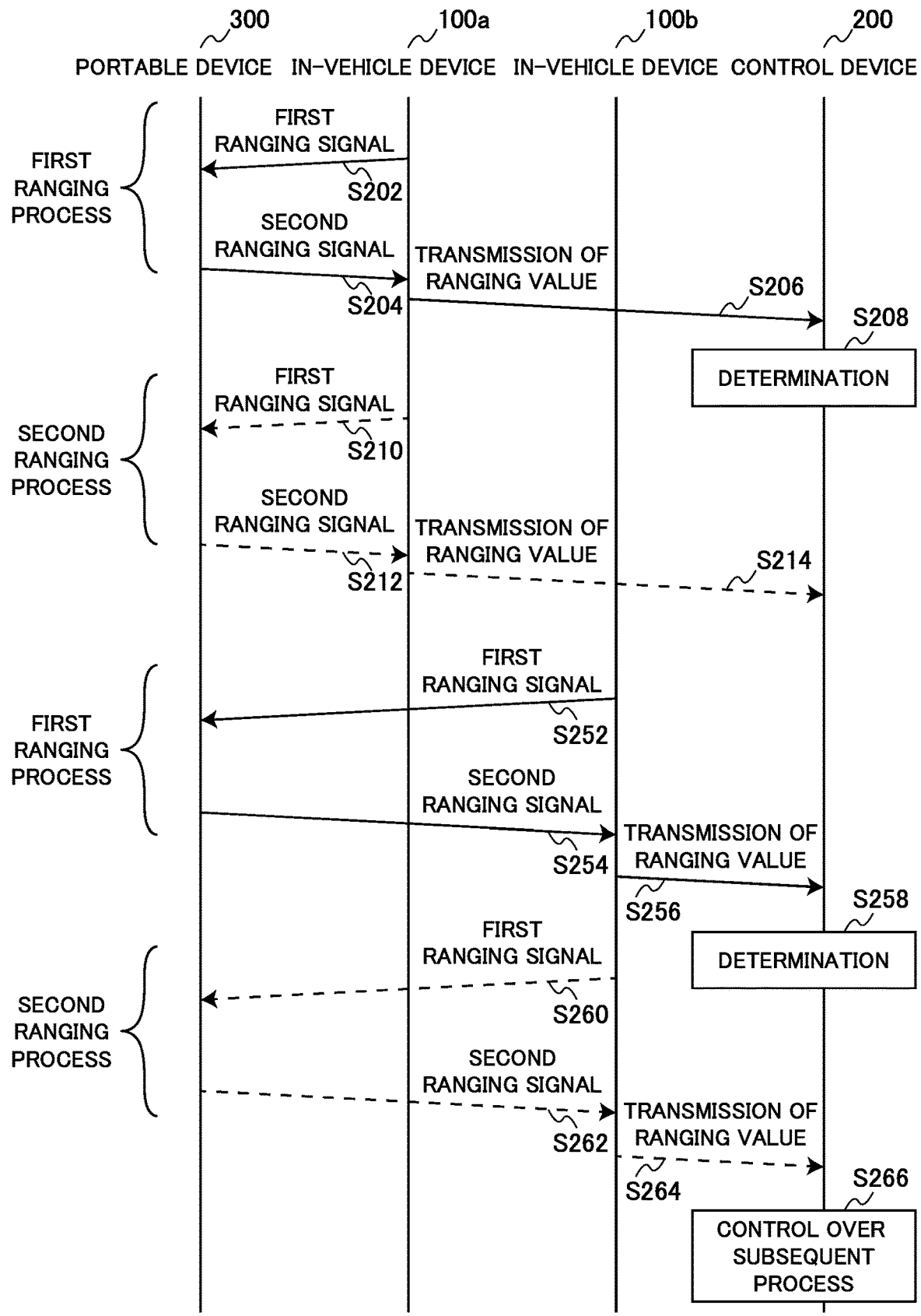
FIG. 3 is a sequence diagram illustrating an example of a flow of control over ranging processes and subsequent processes according to an embodiment of the present invention.
Figure 4:
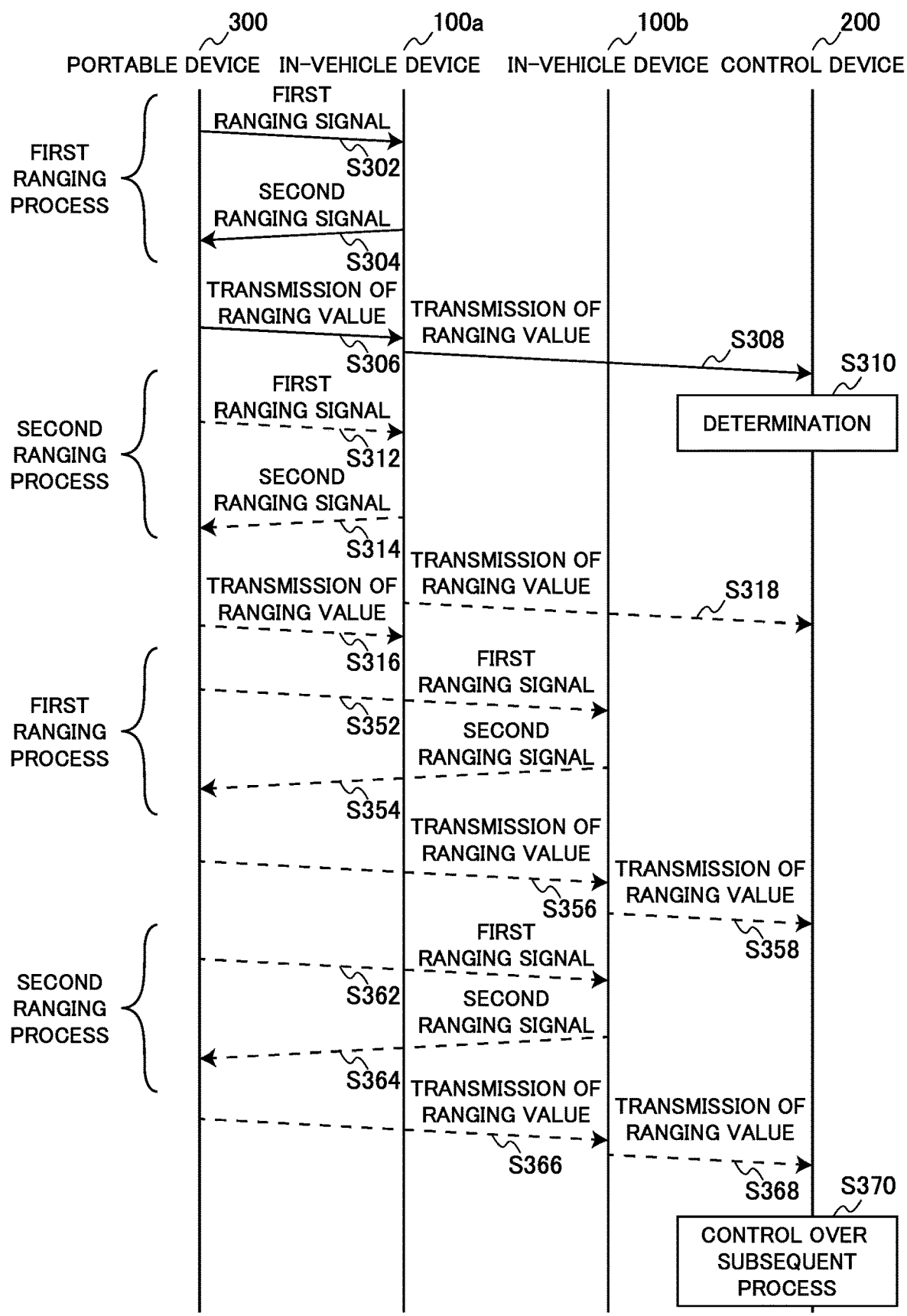
FIG. 4 is a sequence diagram illustrating an example of a flow of control over ranging processes and subsequent processes according to the embodiment.
Figure 5:
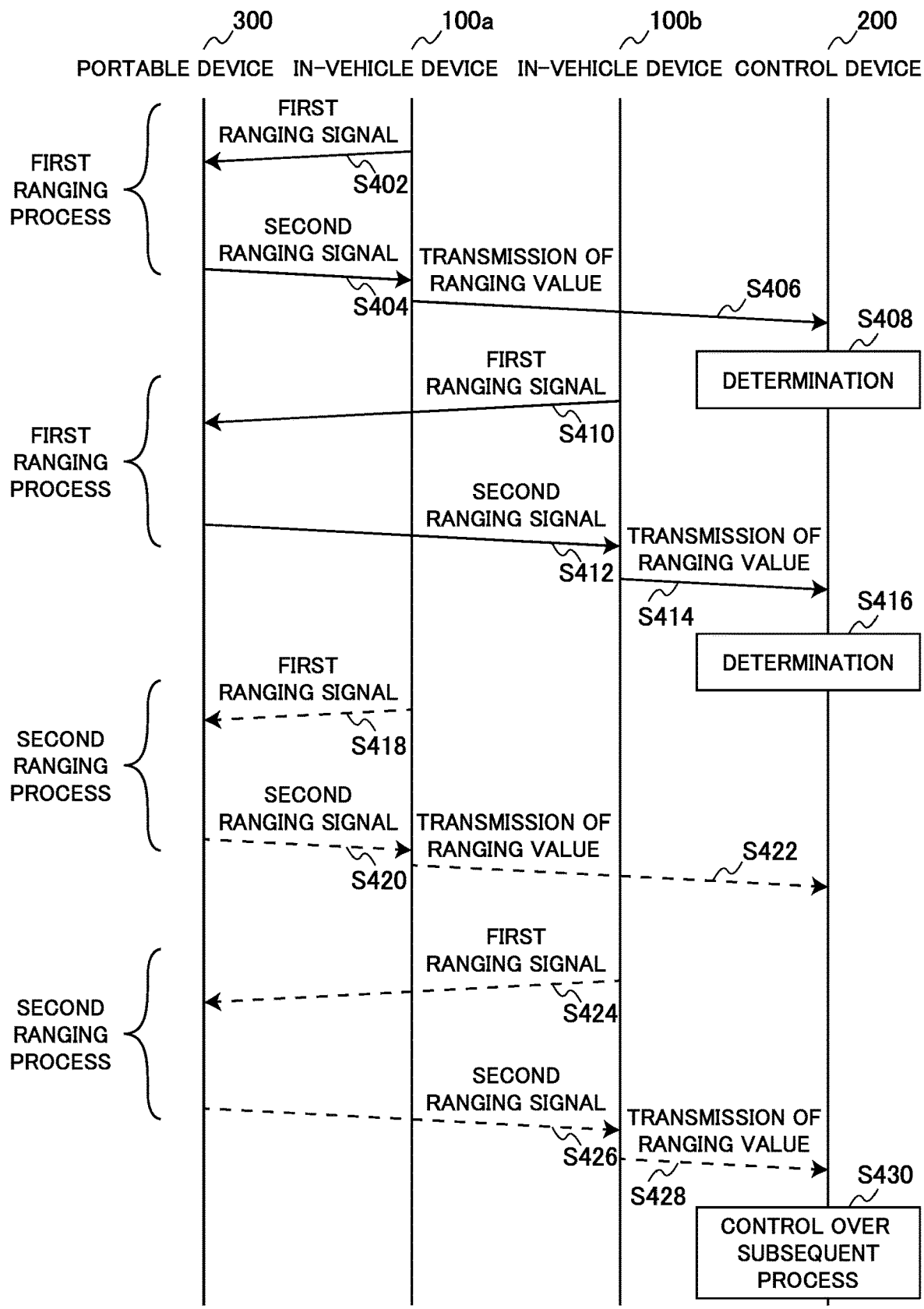
FIG. 5 is a sequence diagram illustrating an example of a flow of control over ranging processes and subsequent processes according to the embodiment.

Accordingly, to solve the above-described issue, the control device 200 according to the present embodiment may cancel a subsequent ranging process when a ranging value that satisfies the designated allowable value is acquired, even in the case where the ranging process is not executed the designated number of times. FIG. 3 to FIG. 5 are sequence diagrams, each of which illustrating an example of a flow of control over ranging processes and subsequent processes according to the present embodiment.

In the case of the example illustrated in FIG. 3, the control section 210 of the control device 200 first causes a ranging process to be executed on the basis of a designated number of times. The ranging process is a process of measuring a distance between the in-vehicle device 100a and the portable device 300. Specifically, in a first ranging process, the in-vehicle device 100a transmits a first ranging signal (Step S202), and the portable device 300 transmits a second ranging signal (Step S204) in response to the first ranging signal transmitted in Step S202. Next, the in-vehicle device 100a calculates a ranging value on the basis of the first ranging signal transmitted in Step S202 and the second ranging signal received in Step S204, and transmits the ranging value to the control device 200 (Step S206).

Next, the control section 210 determines whether or not the ranging value that has been received in Step S206 satisfies a designated allowable value (S208). Here, in the case where the received ranging value satisfies the designated allowable value, the control section 210 cancels a subsequent ranging process between the in-vehicle device 100a and the portable device 300. Note that, in FIG. 3, dotted lines indicate transmission of the first ranging signal (Step S210), transmission of the second ranging signal (Step S212), and transmission of a ranging value (Step S214) in a second ranging process, which is canceled by the control section 210. In the case where the designated number of times is three or more, the control section 210 also cancels third and subsequent ranging processes in a similar way.

On the other hand, in the case where the ranging value that has been received in Step S206 does not satisfy the designated allowable value, the control section 210 causes the second ranging process to be executed. Even in this case, the control section 210 may cancel a subsequent ranging processes between the in-vehicle device 100a and the portable device 300 when a ranging value that satisfies the designated allowable value is acquired.

In the case where the ranging value that satisfies the designated allowable value is acquired and the subsequent ranging process is canceled, or in the case where the ranging process is executed the designated number of times, the control section 210 subsequently causes a ranging process to be executed between the in-vehicle device 100b and the portable device 300 the designated number of times.

First, in a first ranging process, the in-vehicle device 100b transmits a first ranging signal (Step S252), and the portable device 300 transmits a second ranging signal (Step S254) in response to the first ranging signal transmitted in Step S252. Next, the in-vehicle device 100b calculates a ranging value on the basis of the first ranging signal transmitted in Step S252 and the second ranging signal received in Step S254, and transmits the ranging value to the control device 200 (Step S256).

Next, the control section 210 determines whether or not the ranging value that has been received in Step S256 satisfies the designated allowable value (S258). Here, in the case where the received ranging value satisfies the designated allowable value, the control section 210 cancels a subsequent ranging process between the in-vehicle device 100b and the portable device 300. Note that, in FIG. 3, dotted lines indicate transmission of the first ranging signal (Step S260), transmission of the second ranging signal (Step S262), and transmission of a ranging value (Step S264) in a second ranging process, which is canceled by the control section 210. In the case where the designated number of times is three or more, the control section 210 also cancels third and subsequent ranging processes in a similar way.

On the other hand, in the case where the ranging value that has been received in Step S256 does not satisfy the designated allowable value, the control section 210 causes the second ranging process to be executed. Even in this case, the control section 210 may cancel a subsequent ranging processes between the in-vehicle device 100b and the portable device 300 when a ranging value that satisfies the designated allowable value is acquired.

In the case where the ranging value that satisfies the designated allowable value is acquired and the subsequent ranging process is canceled, or in the case where the ranging process is executed the designated number of times, the control section 210 subsequently controls the subsequent process (Step S266). For example, the control section 210 may start the subsequent process in the case where the designated allowable value is acquired by the combination between the in-vehicle device 100a and the portable device 300, and the combination between the in-vehicle device 100b and the portable device 300.

As described above, when the ranging value that satisfies the designated allowable value is acquired, the control section 210 according to the present embodiment may cancel a subsequent ranging process between the communication devices from which the ranging value that satisfies the designated allowable value is acquired. This is because in the case of communication using the UWB, signal propagation speed is close to the speed of light. Therefore, it is envisaged that the ranging value does not drastically fall below an actual distance between the communication devices, and it can be said that the ranging value that satisfies the designated allowable value is highly accurate. Accordingly, such control makes it possible to effectively suppress increase in electric power consumption by canceling subsequent ranging processes when a highly accurate ranging value is acquired.

Note that, FIG. 3 illustrates the example in which, when the in-vehicle device 100 calculates a ranging value and the acquired ranging value satisfies the designated allowable value, the control section 210 cancels a subsequent ranging process only with regard to a combination between communication devices from which the ranging value that satisfies the designated allowable value is acquired. However, control over the ranging processes and the subsequent processes according to the present embodiment is not limited to the example illustrated in FIG. 3. The ranging value may be calculated by the portable device 300. In addition, when the ranging value that satisfies the designated allowable value is acquired, the control section 210 may cancel all the subsequent ranging processes.

In the case of the example illustrated in FIG. 4, the control section 210 first performs control in such a manner that a first ranging process is performed between the in-vehicle device 100a and the portable device 300. Under such control, the portable device 300 transmits a first ranging signal (Step S302), and the in-vehicle device 100a transmits a second ranging signal (Step S304) in response to the first ranging signal transmitted in Step S302.

Next, the portable device 300 calculates a ranging value on the basis of the first ranging signal transmitted in Step S302 and the second ranging signal received in Step S304, and transmits the ranging value to the in-vehicle device 100a (Step S306). In addition, the in-vehicle device 100a transmits the ranging value received in Step S306 to the control device 200 (Step S308).

Next, the control section 210 of the control device 200 determines whether or not the ranging value that has been received in Step S308 satisfies a designated allowable value (S310). Here, in the case where the received ranging value satisfies the designated allowable value, the control section 210 cancels all the subsequent processes. In FIG. 4, dotted lines indicate respective steps (S312 to S368) in a second ranging process between the in-vehicle device 100a and the portable device 300, first and second ranging processes between the in-vehicle device 100b and the portable device 300, which are canceled by the control section 310. In the case where the designated number of times is three or more, the control section 210 also cancels third and subsequent ranging processes in a similar way.

On the other hand, in the case where the ranging value that has been received in Step S308 does not satisfy the designated allowable value, the control section 210 causes the second ranging process to be executed between the in-vehicle device 100a and the portable device 300. Even in this case, the control section 210 may cancel all the subsequent ranging processes when a ranging value that satisfies the designated allowable value is acquired.

In the case where a ranging value that satisfies the designated allowable value is acquired through any of the ranging process between the in-vehicle device 100a and the portable device 300 and the ranging process between the in-vehicle device 100b and the portable device 300, the control section 210 performs control in such a manner that the subsequent process starts (Step S370). On the other hand, in the case where all ranging values acquired through the ranging process between the in-vehicle device 100a and the portable device 300 and the ranging process between the in-vehicle device 100b and the portable device 300 do not satisfies the designated allowable value, the control section 210 may perform control in such a manner that the subsequent process is not executed.

As described above, when the ranging value that satisfies the designated allowable value is acquired, the control section 210 according to the present embodiment may cancel all the subsequent ranging processes. In this case, it is possible to suppress electric power consumption more effectively.

Note that, FIG. 3 and FIG. 4 illustrates the examples in which the control section 210 sequentially repeats control to cause the ranging process to be executed the designated number of times, for each combination of the communication devices (the control section 210 causes the ranging process to be executed between the in-vehicle device 100a and the portable device 300 the designated number of times, and then causes the ranging process to be executed between the in-vehicle device 100b and the portable device 300 the designated number of times). On the other hand, the control section 210 according to the present embodiment may exercise control the designated number of times to cause the ranging processes of respective combinations of the communication devices to be sequentially executed. For example, the control section 210 may repeatedly exercise control the designated number of times, in such a manner that a process of executing the ranging process between the in-vehicle device 100a and the portable device 300 and executing the ranging process between the in-vehicle device 100b and the portable device 300 is repeatedly executed.

In the case of the example illustrated in FIG. 5, the control section 210 first performs control in such a manner that a first ranging process is performed between the in-vehicle device 100a and the portable device 300. Under such control, the in-vehicle device 100a transmits a first ranging signal (Step S402), and the portable device 300 transmits a second ranging signal (Step S404) in response to the first ranging signal transmitted in Step S402.

Next, the in-vehicle device 100a calculates a ranging value on the basis of the first ranging signal transmitted in Step S402 and the second ranging signal received in Step S404, and transmits the ranging value to the control device 200 (Step S406).

Next, the control section 210 of the control device 200 determines whether or not the ranging value that has been received in Step S406 satisfies a designated allowable value (S408). Here, in the case where the received ranging value satisfies the designated allowable value, the control section 210 cancels a subsequent ranging process between the in-vehicle device 100a and the portable device 300. Note that, in FIG. 5, dotted lines indicate transmission of the first ranging signal (Step S418), transmission of the second ranging signal (Step S420), and transmission of a ranging value (Step S422) in a second ranging process between the in-vehicle device 100a and the portable device 300, which is canceled by the control section 210. In the case where the designated number of times is three or more, the control section 210 also cancels third and subsequent ranging processes between the in-vehicle device 100a and the portable device 300 in a similar way.

On the other hand, in the case where the ranging value that has been received in Step S406 does not satisfy the designated allowable value, the control section 210 does not have to cancel the second ranging process between the in-vehicle device 100a and the portable device 300. Even in this case, the control section 210 cancels a subsequent ranging processes between the in-vehicle device 100a and the portable device 300 when a ranging value that satisfies the designated allowable value is acquired through the ranging process between these communication devices.

When the determination process in Step S408 ends, the control section 210 subsequently performs control in such a manner that a first ranging process is performed between the in-vehicle device 100b and the portable device 300. Under such control, the in-vehicle device 100b transmits a first ranging signal (Step S410), and the portable device 300 transmits a second ranging signal (Step S412) in response to the first ranging signal transmitted in Step S410.

Next, the in-vehicle device 100b calculates a ranging value on the basis of the first ranging signal transmitted in Step S410 and the second ranging signal received in Step S412, and transmits the ranging value to the control device 200 (Step S414).

Next, the control section 210 of the control device 200 determines whether or not the ranging value that has been received in Step S414 satisfies a designated allowable value (S416). Here, in the case where the received ranging value satisfies the designated allowable value, the control section 210 cancels a subsequent ranging process between the in-vehicle device 100b and the portable device 300. Note that, in FIG. 5, dotted lines indicate transmission of the first ranging signal (Step S424), transmission of the second ranging signal (Step S426), and transmission of a ranging value (Step S428) in a second ranging process between the in-vehicle device 100b and the portable device 300, which is canceled by the control section 210. In the case where the designated number of times is three or more, the control section 210 also cancels third and subsequent ranging processes between the in-vehicle device 100b and the portable device 300 in a similar way.

On the other hand, in the case where the ranging value that has been received in Step S414 does not satisfy the designated allowable value, the control section 210 does not have to cancel the second ranging process between the in-vehicle device 100b and the portable device 300. Even in this case, the control section 210 cancels a subsequent ranging processes between the in-vehicle device 100b and the portable device 300 when a ranging value that satisfies the designated allowable value is acquired through the ranging process between these communication devices.

In addition, in the case where ranging values that satisfy the designated allowable value are acquired from both the combination of the in-vehicle device 100a and the portable device 300 and the combination of the in-vehicle device 100b and the portable device 300, the control section 210 performs control in such a manner that the subsequent process starts (Step S430).

The detailed examples of controlling the ranging process and the subsequent process according to the present embodiment have been described above with reference to FIG. 3 to FIG. 5. Such control makes it possible to provide the mechanism that is capable of suppressing increase in electric power consumption while assuring accuracy of measuring distances between devices.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above-described embodiment, the UWB has been exemplified as the designated wireless communication standard. However, the wireless communication standard according to the present invention is not limited thereto. Any standard that enables the ranging process based on transmission/reception of signals may be adopted as the wireless communication standard according to the present invention. The any standard described herein includes signal communication using BLUETOOTH low energy (BLE), signal communication using ZIGBEE (registered trademark), signal communication using WI-FI (registered trademark), and the like.

In addition, in the above-described embodiment, the case where it is determined whether or not to execute the subsequent process on the basis of whether or not a ranging value satisfies the designated allowable value has been described as an example. However, it is also possible for the control device according to the present invention to use a result of another authentication process to determine whether or not to execute the subsequent process. Examples of the authentication process include the request response authentication described above.

Note that, the series of processes performed by the devices described in this specification may be achieved by any of software, hardware, and a combination of software and hardware. A program that configures the software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in the present specification, the processes described using the sequence diagrams are not necessarily executed in the order illustrated in the drawings. Some processing steps may be executed in parallel. In addition, additional processing steps may be employed and some processing steps may be omitted.

What is claimed is:

1. A control device comprising:
a controller, including a processor and a memory, configured to cause a ranging process of measuring a distance between communication devices to be executed a designated plurality of times repeatedly for a predetermined time, and control a subsequent process that is a process of using a ranging value, amongst a plurality of ranging values acquired during the designated plurality of times, that satisfies a designated allowable value acquired during the repeated measuring of the distance between the communication devices, on a basis of whether or not at least any of the plurality of ranging values that have been acquired satisfies the designated allowable value,
wherein the controller controls start of the subsequent process when the ranging value that satisfies the designated allowable value is acquired,
wherein the controller causes the ranging process to be executed the designated plurality of times for each combination of the communication devices, and controls the ranging process and the subsequent process, and
wherein, when the ranging value that satisfies the designated allowable value is acquired, the controller cancels a subsequent ranging process with regard to a combination between the communication devices from which the ranging value that satisfies the designated allowable value is acquired,
wherein the ranging process includes transmission of a first ranging signal from one of the communication devices to another communication device, transmission of a second ranging signal from the other communication device to the one communication device in response to the first ranging signal, and calculation of the ranging value on a basis of time it takes to transmit and receive the first ranging signal and the second ranging signal, and wherein the ranging process includes a process of transmitting the first ranging signal and the second ranging signal through ultra-wideband wireless communication.

2. The control device according to claim 1,
wherein, when the ranging value that satisfies the designated allowable value is acquired, the controller cancels all subsequent ranging processes.

3. The control device according to claim 1,
wherein the controller sequentially repeats control to cause the ranging process to be executed the designated plurality of times, for each combination of the communication devices.

4. The control device according to claim 1,
wherein the controller controls the designated plurality of times to cause the ranging processes of respective combinations of the communication devices to be sequentially executed.

5. The control device according to claim 1,
wherein the controller performs control in such a manner that the subsequent process is not executed in a case where all the ranging processes that have been acquired do not satisfy the designated allowable value.

6. The control device according to claim 1,
wherein the subsequent process includes at least any of an unlocking process and an activation process, the unlocking process being a process of unlocking a lock device installed in an open/close mechanism including an openable/closable part, the activation process being a process of activating a predetermined device.

7. The control device according to claim 1,
wherein the ranging process includes a process of calculating a ranging value of a distance between a communication device installed in a vehicle and a communication device installed in a portable device.

8. A control device comprising:
a controller, including a processor and a memory, configured to cause a ranging process of measuring a distance between communication devices to be executed a designated plurality of times repeatedly for a predetermined time, and control a subsequent process that is a process of using a ranging value, amongst a plurality of ranging values acquired during the designated plurality of times, that satisfies a designated allowable value acquired during the repeated measuring of the distance between the communication devices, on a basis of whether or not at least any of the plurality of ranging values that have been acquired satisfies the designated allowable value,
wherein the controller controls start of the subsequent process when the ranging value that satisfies the designated allowable value is acquired,
wherein the ranging process includes transmission of a first ranging signal from one of the communication devices to another communication device, transmission of a second ranging signal from the other communication device to the one communication device in response to the first ranging signal, and calculation of the ranging value on a basis of time it takes to transmit and receive the first ranging signal and the second ranging signal, and
wherein the ranging process includes a process of transmitting the first ranging signal and the second ranging signal through ultra-wideband wireless communication.

9. A non-transitory storage medium having a program stored therein, the program causing a computer to achieve a control function of causing a ranging process of measuring a distance between communication devices to be executed a designated plurality of times repeatedly for a predetermined time, and controlling a subsequent process that is a process of using a ranging value, amongst a plurality of ranging values acquired during the designated plurality of times, that satisfies a designated allowable value acquired during the repeated measuring of the distance between the communication devices, on a basis of whether or not at least any of the plurality of ranging values that have been acquired satisfies the designated allowable value,
wherein the control function controls start of the subsequent process when the ranging value that satisfies the designated allowable value is acquired,
wherein the control function causes the ranging process to be executed the designated plurality of times for each combination of the communication devices, and controls the ranging process and the subsequent process,
wherein, when the ranging value that satisfies the designated allowable value is acquired, the control function cancels a subsequent ranging process with regard to a combination between the communication devices from which the ranging value that satisfies the designated allowable value is acquired,
wherein the ranging process includes transmission of a first ranging signal from one of the communication devices to another communication device, transmission of a second ranging signal from the other communication device to the one communication device in response to the first ranging signal, and calculation of the ranging value on a basis of time it takes to transmit and receive the first ranging signal and the second ranging signal, and
wherein the ranging process includes a process of transmitting the first ranging signal and the second ranging signal through ultra-wideband wireless communication.

10. A control device comprising:
a controller, including a processor and a memory, configured to cause a ranging process of measuring a distance between communication devices to be executed a designated plurality of times, and control a subsequent process that is a process of using a ranging value, amongst a plurality of ranging values acquired during the designated plurality of times, that satisfies a designated allowable value, on a basis of whether or not at least any of the plurality of ranging values that have been acquired satisfies the designated allowable value,
wherein the controller controls start of the subsequent process when the ranging value that satisfies the designated allowable value is acquired,
wherein the controller causes the ranging process to be executed the designated plurality of times for each combination of the communication devices, and controls the ranging process and the subsequent process,
wherein, when the ranging value that satisfies the designated allowable value is acquired, the controller cancels a subsequent ranging process with regard to a combination between the communication devices from which the ranging value that satisfies the designated allowable value is acquired,
wherein a frequency band utilized in the ranging process is one utilized by ultra-wideband (UWB), BLUETOOTH low energy (BLE), WI-FI, or ZIGBEE,
wherein the ranging process includes transmission of a first ranging signal from one of the communication devices to another communication device, transmission of a second ranging signal from the other communication device to the one communication device in response to the first ranging signal, and calculation of the ranging value on a basis of time it takes to transmit and receive the first ranging signal and the second ranging signal, and wherein the ranging process includes a process of transmitting the first ranging signal and the second ranging signal through ultra-wideband wireless communication.

11. A control device comprising:

a controller, including a processor and a memory, configured to cause a ranging process of measuring a distance between communication devices to be executed a designated plurality of times, and control a subsequent process that is a process of using a ranging value, amongst a plurality of ranging values acquired during the designated plurality of times, that satisfies a designated allowable value, on a basis of whether or not at least any of the plurality of ranging values that have been acquired satisfies the designated allowable value, wherein the controller controls start of the subsequent process when the ranging value that satisfies the designated allowable value is acquired, wherein the controller causes the ranging process to be executed the designated plurality of times for each combination of the communication devices, and controls the ranging process and the subsequent process, wherein, when the ranging value that satisfies the designated allowable value is acquired, the controller cancels all subsequent ranging processes, and wherein a frequency band utilized in the ranging process is one utilized by ultra-wideband (UWB), BLUETOOTH low energy (BLE), WI-FI, or ZIGBEE, wherein the ranging process includes transmission of a first ranging signal from one of the communication devices to another communication device, transmission of a second ranging signal from the other communication device to the one communication device in response to the first ranging signal, and calculation of the ranging value on a basis of time it takes to transmit and receive the first ranging signal and the second ranging signal, and wherein the ranging process includes a process of transmitting the first ranging signal and the second ranging signal through ultra-wideband wireless communication.

* * * * *